United States Patent [19]
Sakurai et al.

[11] Patent No.: US 6,198,713 B1
[45] Date of Patent: Mar. 6, 2001

[54] POWER TRANSMITTING MECHANISM FOR DISK APPARATUS

[75] Inventors: Toshihiro Sakurai; Kenji Abe; Keisuke Nakayama, all of Miyagi-ken (JP)

[73] Assignee: Alps Electric Co., Ltd. (JP)

[ * ] Notice: Subject to any disclaimer, the term of this patent is extended or adjusted under 35 U.S.C. 154(b) by 0 days.

[21] Appl. No.: 09/264,277

[22] Filed: Mar. 8, 1999

[30] Foreign Application Priority Data

Mar. 16, 1998 (JP) .................................................. 10-065034

[51] Int. Cl.[7] .................................................. G11B 17/04
[52] U.S. Cl. .......................................................... 369/77.1
[58] Field of Search ........................... 360/99.03, 99.07, 360/99.02, 99.06; 369/75.2, 270, 271, 219, 77.1, 36, 38

[56] References Cited

U.S. PATENT DOCUMENTS

| | | | | |
|---|---|---|---|---|
| 4,670,802 | * | 6/1987 | Ogawa et al. | 360/97 |
| 5,022,023 | | 6/1991 | Toyoguchi | 369/77.1 |
| 5,119,357 | * | 6/1992 | Tsuruta et al. | 369/75 |
| 5,583,839 | | 12/1996 | Choi | 369/75.2 |
| 5,586,103 | * | 12/1996 | Takamatsu et al. | 364/244 |
| 5,793,730 | | 8/1998 | Ootsuka | 369/77.1 |
| 5,886,977 | * | 3/1999 | Ota et al. | 369/219 |
| 6,044,057 | * | 3/2000 | Park et al. | 369/219 |

FOREIGN PATENT DOCUMENTS

| | | |
|---|---|---|
| 0 557 975 A2 | 9/1993 | (EP) . |
| 59-215066 | 12/1984 | (JP) . |
| 1-317271 | 12/1989 | (JP) . |
| 6-111443 | 4/1994 | (JP) . |
| 8-106694 | 4/1996 | (JP) . |

* cited by examiner

Primary Examiner—David L. Ometz
Assistant Examiner—Tianjie Chen
(74) Attorney, Agent, or Firm—Brinks Hofer Gilson & Lione

[57] ABSTRACT

A transmission gear is comprised of a fitting portion of an upper toothed wheel being fit with a fitting portion of a lower toothed wheel so that both are axially movable. Accordingly, even in the event that a lid plate which has a disk introducing mechanism and a clamping chassis which has a clamping mechanism ascend or descend, certain power can be transmitted to a large gear (first gear) and a rotating cam (second gear) in a sure manner. Thus, the disk introducing mechanism and the disk discharging mechanism can both be driven with a single simple power transmitting mechanism. Also, the disk introducing operation and the disk discharging operation can be performed in a parallel manner, thereby reducing the amount of time required to exchange disks.

3 Claims, 7 Drawing Sheets

POWER TRANSMITTING MECHANISM FOR DISK APPARATUS

BACKGROUND OF THE INVENTION

1. Field of the Invention

The present invention relates to a disk apparatus which performs transporting of disks such as CD or DVD disks using dedicated loading means and dedicated discharging means, and particularly to a power transmitting mechanism for a disk apparatus wherein the loading means and discharging means are driven by the same power.

2. Description of the Related Art

With known slot-insertion type disk devices, a transporting roller serving as a disk transporting means is provided near the rear plane of the insertion opening, and loading or discharging of the disk is performed by the feeding force of this transporting roller. Examples of such arrangements include a type wherein the disk is pinched between the aforementioned transporting roller and a slave roller provided parallel with the transporting roller, or an arrangement wherein the disk is pinched between the aforementioned transporting roller and a disk guide member provided on the ceiling plane or some other like position in the disk apparatus.

With known disk devices, the disk which has been inserted from the inserting opening is transported to a disk driving unit provided at the rear portion of the apparatus by means of the feeding force of the transporting roller rotating in the forward direction, whereby the disk is placed on a turntable within the disk driving unit. Then, as the disk transporting means escapes the disk, a clamper descends so that the disk is pinched between the clamper and the turntable. Next, a certain rotation is provided thereby by a spindle motor, following which the disk is played or recorded onto using a pick-up.

Also, when discharging the disk, the rotation of the spindle motor is stopped, the clamper rises so as to release the disk, and the disk is pinched once more by the disk transporting means as described above. Then, providing reverse rotation to the transporting roller discharges the disk from the disk driving unit, and further from the above-described inserting opening.

With such disk apparatuses as described above, a transporting roller is used, and the disk is loaded or discharged by rotating the transporting roller forwards or backwards. However, with known disk apparatuses, in the event of the user exchanging disks, any disk which was being played or recorded onto has to be externally discharged, and the new disk inserted into the disk apparatus, necessitating time for exchanging disks.

As one way for solving this problem, an arrangement may be conceived wherein the disk loading means and disk discharging means are separated, so that the disk loading means performs the action of introducing a new disk into the apparatus, and the disk discharging means performs the action of discharging the disk which is already loaded, thereby reducing the time required for exchanging disks. However, driving the disk loading means and discharging means with individual driving forces is problematic since the disk apparatus itself becomes complicated.

SUMMARY OF THE INVENTION

The present invention has been made in order to solve the above-described problems of the known art, and accordingly, it is an object of the present invention to provide a simple power transmitting mechanism for a disk apparatus by driving the disk loading means and disk discharging means with the same power.

According to one aspect of the present invention, a power transmitting mechanism for a disk apparatus comprises: a first gear provided to the upper side of a disk inserting area; a second gear provided to the lower side of the disk inserting area; and a third gear which meshes with both the first gear and the second gear, thereby simultaneously driving both of the gears; wherein both of the gears are rotated coaxially and at the same pitch circle; and wherein the second gear causes action of a disk discharging means at the time of the first gear causing action of a disk loading means.

With the power transmitting mechanism for a disk apparatus according to the present invention, power to the loading mechanism which loads the disk is transmitted by the first gear and power to the discharging mechanism which discharges the disk is transmitted by the second gear, with the first and second gears being simultaneous driven by the third gear, whereby the disk loading action and disk discharging action can be performed in a parallel manner. Accordingly, time required for exchanging disks can be reduced.

Also, an arrangement is preferable wherein the third gear comprises an upper toothed wheel for meshing with the first gear, and a lower toothed wheel for meshing with the second gear, so that in a state wherein a fitting portion formed on the first gear and a fitting portion formed on the second gear are engaged, the upper toothed wheel and lower toothed wheel approach one another or are distanced.

With this arrangement, the third gear can freely move in the axial direction, so certain force can be supplied to the first gear and the second gear in a sure manner even in the event that the lid plate having transporting members or clamp chassis having a clamping mechanism move up or down.

It is further preferable that the disk on the turntable be clamped when the upper toothed wheel and lower toothed wheel approach one another.

DESCRIPTION OF THE PREFERRED EMBODIMENT

The present invention will now be described with reference to the drawings.

Figure 1A:
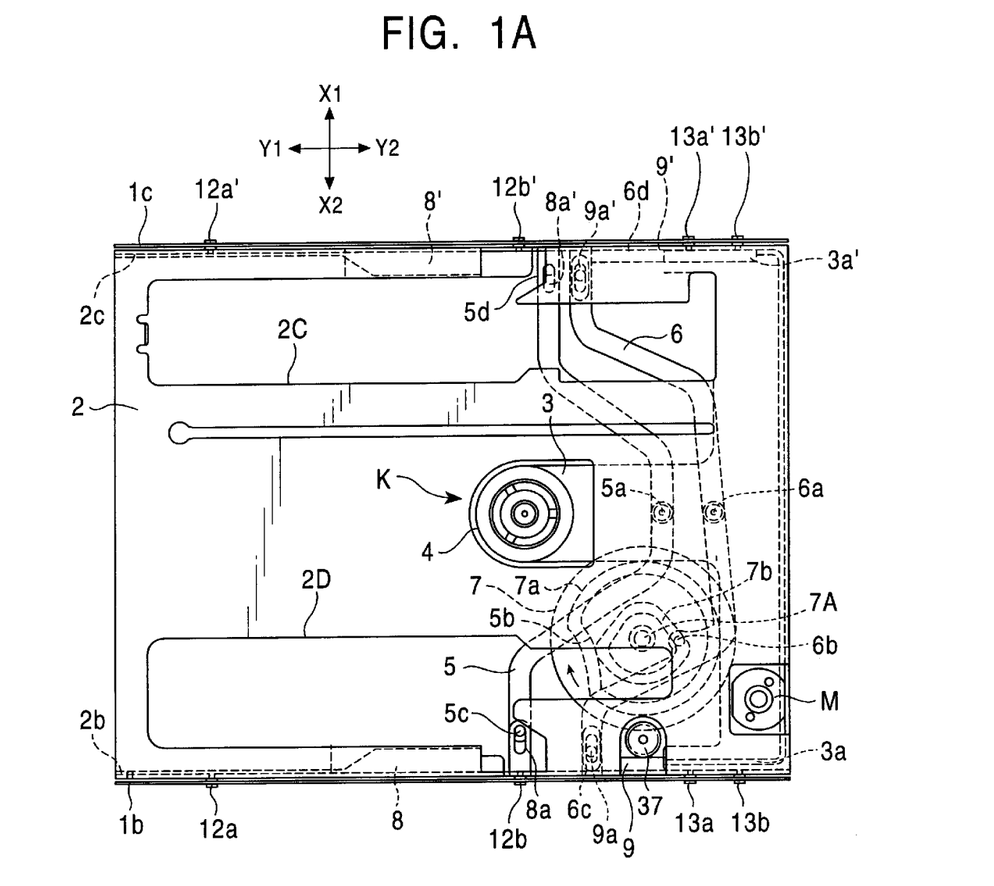
FIGS. 1A and 1B illustrate the main housing of the disk apparatus according to the present invention, with FIG. 1A being a plan view and FIG. 1B being a side view of FIG. 1A.
Figure 1B:
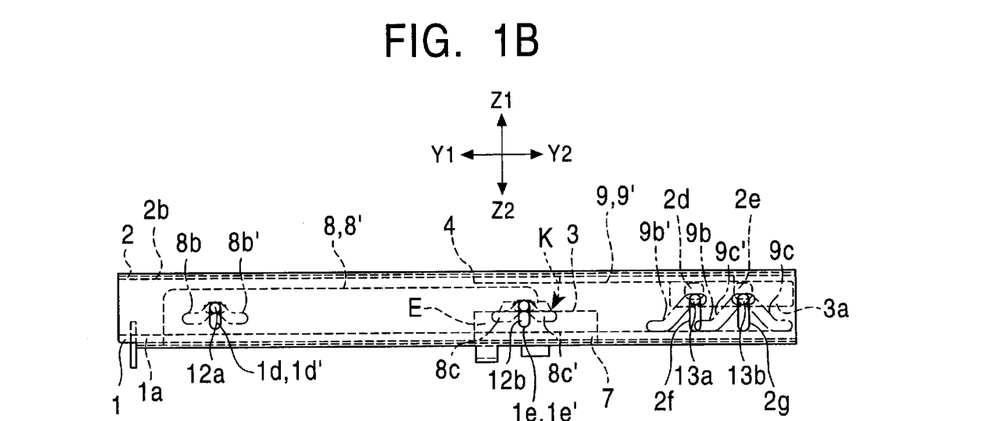

FIGS. 1A and 1B illustrate the main housing of the disk apparatus according to the present invention, with FIG. 1A being a plan view and FIG. 1B being a side view of FIG. 1A.

The disk apparatus shown in FIG. 1 is arranged such that the main housing which is the base plate side is covered by a lid plate 2 which is provided toward the top plane (Z1). Provided between the main housing and the lid plate 2 is a clamping mechanism K comprised of a clamp chassis 3 and a clamper 4 rotatably supported on the tip thereof. In the drawing, Y1 indicates the side form which the disk is inserted, and Y2 is the deeper portion of the apparatus. Also, two openings are provided toward the Y1 side of this disk apparatus, i.e., an inserting opening and discharging opening, these being arrayed vertically (not shown in the drawings).

On the base plane 1a of the main housing 1, a linkage member 5 formed in a generally V-shaped form and a second linkage member 6 are provided next to each other, these being axially supported by center axes 5a and 6a so as to rock. A rotating shaft 7A is provided between the first linkage member 5 and the second linkage member 6. Rotatably supported on this rotating shaft 7A is a disk-shaped rotating cam (second gear) 7. The rotating cam 7 is provided to the upper side of the first linkage member 5 and the second linkage member 6. A plurality of cam grooves are formed on both the front face and rear face of this rotating cam 7, and FIG. 1 shows the cam grooves 7a and 7b formed on the rear side (Z2) with dotted lines. Also, gear grooves are provided around the edge of the rotating cam 7, so as to mesh with a later-described transmitting gear (third gear) 37 and a small gear 47. A protrusion 5b provided on the first linkage member 5 is inserted into the cam groove 7a on the outer perimeter on one hand, and on the other hand, a protrusion 6b provided on the second linkage member 6 is inserted through the cam groove 7b on the inner perimeter. Also, a driving motor M is provided to one corner of the disk apparatus (i.e., to the Y2 and X2 side), so that the rotating cam 7 rotates in a clockwise direction in the drawing by a gear train (not shown). Rotation of the rotating can 7 causes the aforementioned protrusions 5b and 6b to move through the cam grooves 7a and 7b, respectively. This motion causes the first linkage member 5 and second linkage member 6 to rock on the aforementioned center shafts 5a and 6a in a clockwise or counter-clockwise direction.

Protrusions 5c and 5d are formed on the respective ends of the first linkage member 5. These protrusions 5c and 5d are inserted through elongated holes 8a and 8a' opened in a portion of elevating members 8 or 8' that are provided along the side plates 1b or 1c of the main housing 1. In the same way, protrusions 6c and 6d are formed on the respective ends of the second linkage member 6, and these protrusions 5c and 5d are inserted through elongated holes 9a and 9a' opened in a portion of elevating members 9 and 9'. The elevating members 8 and 9 are provided along the side plate 1b of the main housing 1 so as to be slidable in the direction indicated by Y in the drawing, and as shown in FIG. 1B, the side plates bent toward the Z1 side have crank grooves 8b and 8c, and crank grooves 9b and 9c provided therein. In the same way, as shown by dotted lines in the drawing, the side plates of the elevating members 8' and 9' bent toward the Z1 side have crank grooves 8b', and 8c', and crank grooves 9b' and 9c' provided therein. However, while the crank grooves 8b and 8c incline upwards toward the Y2 side in the drawing, the crank grooves 8b' and 8c' incline downwards toward the Y2 side in the drawing. In the same way, while the crank grooves 9b and 9c incline downwards toward the Y2 side in the drawing, the crank grooves 9b', and 9c' incline upwards toward the Y2 side in the drawing. In other words, the crank grooves 8b and 8c and crank grooves 8b ' and 8c', and the crank grooves 9b and 9c and crank grooves 9b' and 9c', form horizontally non-symmetrical crank grooves. Further, elongated holes 1d and 1e extending in the Z direction are opened in the side plate 1b of the main housing 1, so as to overlap with the aforementioned crank grooves 8b and 8c. In the same manner, elongated holes 1d' and 1e', extending in the Z direction are opened in the side plate 1c of the main housing 1, so as to overlap with the aforementioned crank grooves 8b' and 8c'.

Also, moving pins 12a and 12b which protrude in the X2 direction in the drawing are provided to the one side plate 2b of the lid plate 2, and moving pins 12a' and 12b' which protrude in the X1 direction in the drawing are provided to the other side plate 2c. The moving pin 12a is inserted through the aforementioned crank groove 8b and the elongated hole 1d, and the moving pin 12b is inserted through the aforementioned crank groove 8c and the elongated hole 1e. This is also true for the side plate 1c toward the X1 side, as well, wherein the moving pin 12a' is inserted through the aforementioned crank groove 8b', and the elongated hole 1d', and the moving pin 12b', is inserted through the aforementioned crank groove 8c' and the elongated hole 1e'.

For example, in the event that the rotating cam 7 rotates, and the first linkage member 5 rocks in the counter-clockwise direction in the drawing, the elevating member 8 moves in the direction Y2 in the figure, and the elevating member 8' moves in the direction Y1. At this time, the moving pins 12a and 12b descend the inclination of the crank grooves 8b and 8b' on the side of the side plate 1b, and the moving pins 12a' and 12b', descend the inclination of the crank grooves 8c and 8c' on the side of the side plate 1c, so the lid plate 2 descends in the direction Z2 in the drawing. On the other hand, in the event that the first linkage member 5 rocks in the clockwise direction, the elevating member 8 moves in the direction Y1 in the drawing, and the elevating member 8' moves in the direction Y2. Accordingly, opposite to the above case, the moving pins 12a and 12b ascend the inclination of the crank grooves 8b and 8b' on the side of the side plate 1b, and the moving pins 12a' and 12b' ascend the inclination of the crank grooves 8c and 8c' on the side of the side plate 1c, so the lid plate 2 ascends in the direction Z1 in the drawing.

Also, a clamp chassis is provided between the main housing 1 and the lid plate 2. Provided to the side plates 3a and 3a' of the clamp chassis 3 are moving pins 13a and 13b, and 13a' and 13b', which protrude from both sides. The moving pins 13a and 13b are inserted through U-shaped grooves 2d and 2e formed in the side plate 2b of the lid plate 2, through the crank groves 9b and 9c opened in the elevating member 9, and further through elongated holes 2f and 2g opened in the side plate 1b of the main housing 1. The arrangement is the same for the moving pins 13a' and 13b' at the X1 side. Accordingly, in the event that the rotating cam 7 rotates and the second linkage member rocks in the clockwise direction, the elevating member 9 moves in the direction Y1 in the drawing and the elevating member 9' moves in the direction Y2 in the drawing. At this time, the moving pins 13a and 13b toward the side plate 3a descend the inclination of the crank grooves 9b and 9c', and the moving pins 13a' and 13b' descend the inclination of the crank grooves 8b' and 8c', so the clamp chassis 3 descends in the direction Z2 in the drawing. Conversely, in the event that the second linkage member 6 rocks in the counter-clockwise direction, the elevating member 9 moves in the direction Y2 in the drawing, and the elevating member 9' moves in the direction Y1. Accordingly, the moving pins 13a and 13b ascend the inclination of the crank grooves 9b and 9c, and the moving pins 13a' and 13b' toward the side plate 3a', ascend the inclination of the crank grooves 9b', and 8c', so the clamp chassis 3 ascends in the direction Z1 in the drawing.

In other words, the ceiling board 2 is elevated in the Z-axial direction by the first linkage member 5, and the clamp chassis 3 by the second linkage member 6.

Figure 2A:
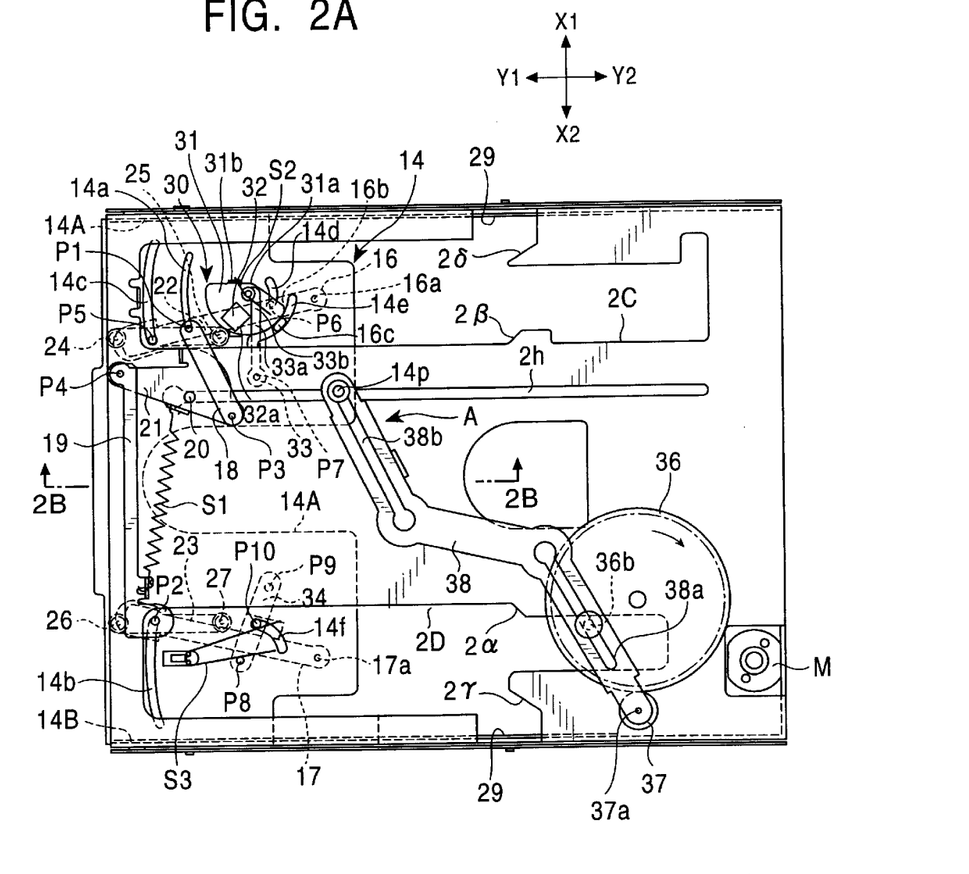
FIGS. 2A and 2B illustrate the lid plate, with FIG. 2A being a plan view and FIG. 2B being an enlarged cross-sectional diagram along line 2—2 in FIG. 2B.
Figure 2B:
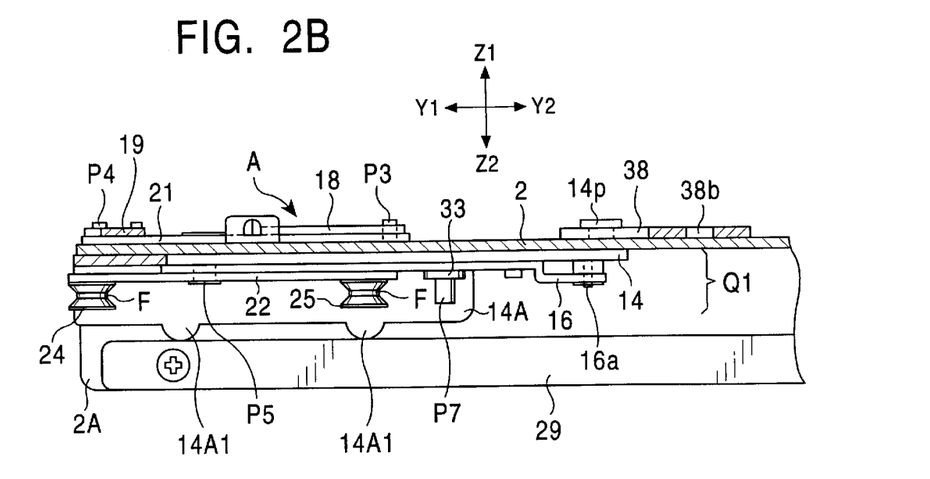

FIGS. 2A and 2B illustrate the lid plate, with FIG. 2A being a detailed plan view and FIG. 2B being an enlarged cross-sectional diagram along line 2—2 in FIG. 2B.

As shown in FIGS. 2A and 2B, the lid plate 2 is provided with transporting means A for introducing the disk toward the deep area of the disk apparatus. The transporting means A is provided on a sliding member 14 disposed mainly to the inner side of the lid plate 2, so as to move over the introduction area Q1 of the lid plate 2 in the Y-axial direction.

Provided to the lower plane of the sliding member 14 are rotating arms 16 and 17, which are rotatably supported by supporting shafts 16a and 17a so as to centrally rotate thereupon. Also, the rotating arm 16 is linked by a connecting pin P1 to one end of a linking member 18 provided to the upper side of the lid plate 2. On the other hand, the rotating arm 17 is linked by a connecting pin P2 to one end of a linking arm 19 provided to the upper side of the lid plate 2. The connecting pins P1 and P2 are slidably inserted through arc-shaped grooves opened in the sliding member 14. The linking member 18 and link arm 19 are connected by respective connecting pins P3 and P4 to both ends of a rotating linking member 21 rotatably provided to a rotating shaft 20 inserted through a guide groove 2h opened on the lid plate 2, and attached to the sliding member 14. Also, the link arm 19 and the rotating linking member 21 are connected with a force-providing member Si such as a coil spring or the like. Accordingly, as shown in FIG. 2, the rotating linking member 21 is rotated in the clockwise direction, the linking member 18 is forced in the X2 direction in the figure, and the link arm in the X1 direction. In other words, the rotating arm 16 and the rotating arm 17 are rotated in directions so as to approach one another.

Also, as shown in FIG. 2B, the sliding member 14 is arranged such that the supporting portions 14A1 protruding from the side plate 14A of the sliding member 14 is supported by a rail member 29 attached to the side plate 2A of the lid plate 2, so as to be movable along the rail member 29 in the direction Y in the Figure. This is true for the other side plate 14B of the sliding member 14.

On the other hand, A supporting pin P5 is provided to the tip of the rotating arm 16, and is inserted through the arc-shaped groove 14c formed on the sliding member 14. A supporting arm 22 is supported on the tip of the supporting pin P5, i.e., on the lower face of the sliding member 14, so as to be capable of rocking. Also, a supporting arm 23 is supported on the tip of the supporting pin P2, following the lower face of the sliding member 14, so as to be capable of rocking. Supporting pulleys 24 and 25, and supporting pulleys 26 and 27 are rotatably supported on both ends of this pair of supporting arms 22 and 23 (supporting members).

Also, a disk detecting mechanism 30 is provided to the upper face of the sliding member 14 neighboring the rotating arm 16. This disk detecting mechanism 30 is comprised of a push-switch 32 provided on a generally fan-shaped rotating base 31, and detecting arm 33, and so forth. The rotating base 31 is axially supported by a rotating shaft 31a. Also, a restricting pin P6 is provided in a protruding manner on the lower face of the rotating base 31, and is inserted through an arc-shaped groove 14d opened in the sliding member 14 and through an elongated hole 16b opened in the rotating arm 16. The detecting arm 33 is formed by bending a metal plate, with one tip thereof being axially supported by the aforementioned rotating shaft 31a. The other bent tip passes through an arc-shaped groove 14e formed on the sliding member 14 and extends to the lower side of the sliding member 14. A detecting pin P7 is erected upon the other tip of this detecting art 33 extending to the lower side, so as to protrude in the direction of the main housing 1 (z2). As described above, the rotating arm 16 is rotated in the counter-clockwise direction, so the aforementioned elongated hole 16b presses the restricting pin P6 in the counter-clockwise direction. Accordingly, the rotating base 31 is rotated in the clockwise direction with the rotating shaft 31a as the center of rotation, as shown in the Figure. Incidentally, a restricting piece 16c formed integrally with the side portion of the rotating arm 16 is positioned at the location facing the arc-shaped groove 14e.

Also, the detecting arm 33 is bent to form a pressing piece 33a and a hanging piece 33b. The pressing piece 33a faces the switch 32a of the push-switch 32 provided on the rotating base 31. Also, a force-providing member S2 formed of a wire spring or the like is hung between the hanging piece 33b and a hanging piece 31b formed by bending part of the rotating base 31. The detecting arm 33 is forced by this force-providing member S2 so as to rotate on the rotating shaft 31a in the clockwise direction as shown in the Figure. Accordingly, the aforementioned hanging piece 33b presses the switch 32a, thus turning the push-switch 32 on.

Also, as shown in FIG. 2A, a detecting arm 34 is rotatably supported on a supporting pin P8 at a position neighboring the other rotating arm 17 and on the lower face of the sliding member 14. A detecting pin 9 is provided on the tip of the detecting arm 34, and a restricting pin P10 is provided between the supporting pin P8 and the detecting pin P9. The detecting pin P9 protrudes in the direction of the main housing 1 (Z2) in the same way as the above detecting pin P7, and is capable of coming into contact with a disk D, as described later. Also, the restricting pin P10 is inserted into an arc-shaped groove 14f formed in the sliding member 14. A force-providing member S3 formed of a wire spring or the like is provided between the aforementioned supporting pin P8 and restricting pin P10. Accordingly, the detecting arm 34 is forced so as to rotate on the supporting pin P8 in the counter-clockwise direction as shown in the Figure.

Figure 7:
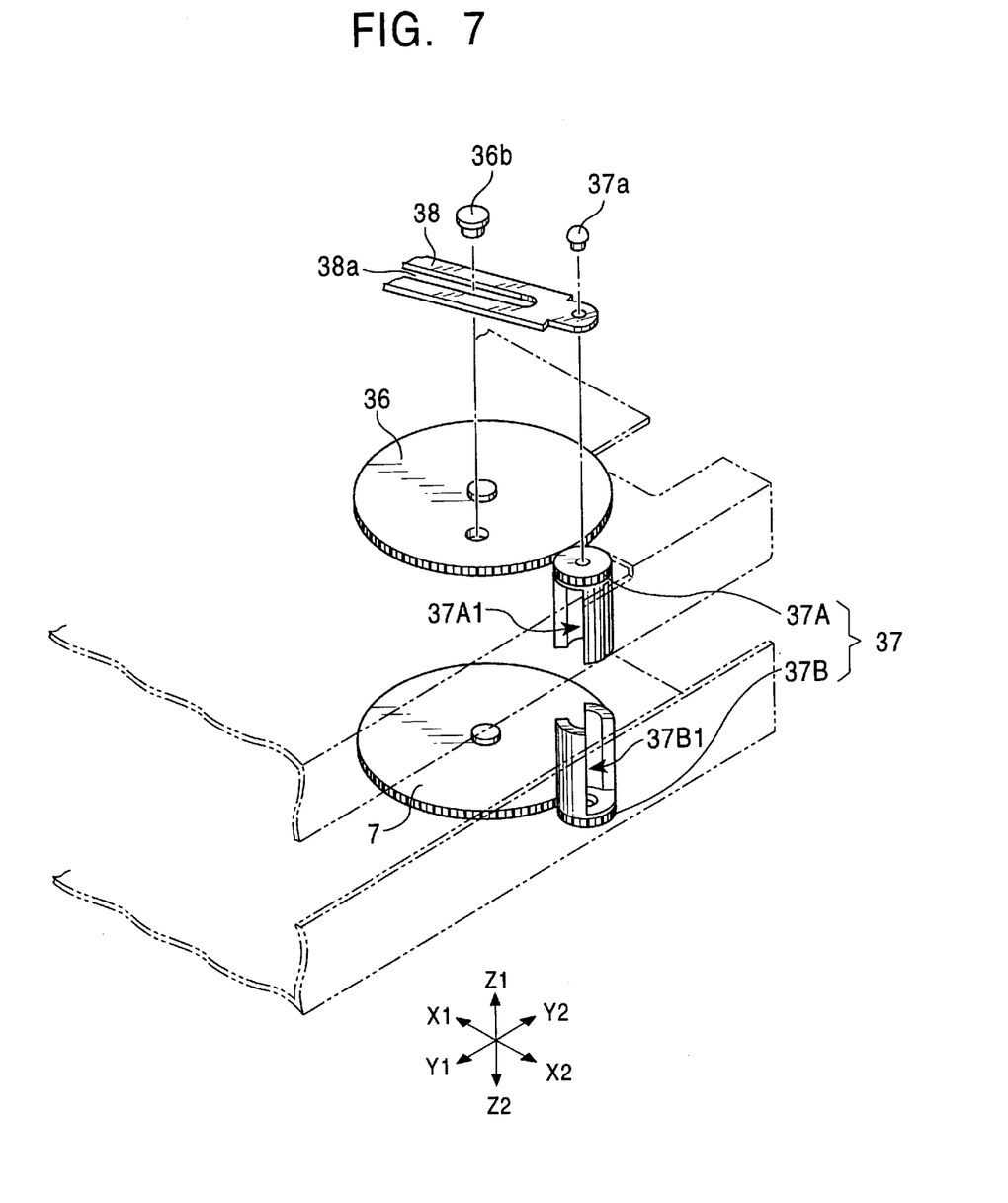
FIG. 7 is a perspective view illustrating a transmission gear.

Also, the rotational driving force of the driving motor M is transmitted to a transmission gear 37 to the side of the main housing 1, through an unshown gear train. FIG. 7 is a perspective view illustrating the transmission gear 37. As shown in FIG. 7, the transmission gear 37 is comprised of an upper toothed wheel 37A which meshes with a large gear (first gear) 36 provided to the upper side of the lid plate 2, and a lower toothed wheel 37B which meshes with the aforementioned rotating cam 7. In other words, this arrangement has fitting portions 37A1 and 37B1 which fit together in a spline-like manner, and in the state wherein these are fit together, the upper toothed wheel 37A is capable of moving in the longitudinal direction (Z direction). Accordingly, even in the event that the lid plate has moved vertically as described above, the driving force of the driving motor M can be transmitted from the lower toothed wheel 37B to the upper toothed wheel 37A. Incidentally, the large gear 36 and the above rotating cam 7 are formed with the same pitch circle, so both can always be rotated synchronously.

One end of a transporting arm 38 is rotatably supported by a rotating shaft 37a on the top edge of the above upper toothed wheel 37A. This transporting arm 38 is formed by pressing a thin metal plate, and two sliding grooves 38a and 38b are opened therein, as shown in FIG. 2A. A guiding pin 36b erected on the surface of the large gear 36 is inserted through one sliding groove 38a. A linking pin 14p which is erected on the sliding member 14 and passes through the guiding groove 2h to protrude to the upper side of the lid plate 2 is inserted through the other sliding groove 38b. Accordingly, in the event that the large gear 36 rotates, the guiding pin 36b moves within the sliding groove 38a, and the transporting arm 38 is rotated on the rotating shaft 37a. Consequently, the guiding pin 14p moves through the aforementioned guiding groove 2h in the Y-axial direction in the Figure, so the sliding member 14 is capable of reciprocal movement between the disk inserting opening and the deep area of the apparatus.

Figure 3A:
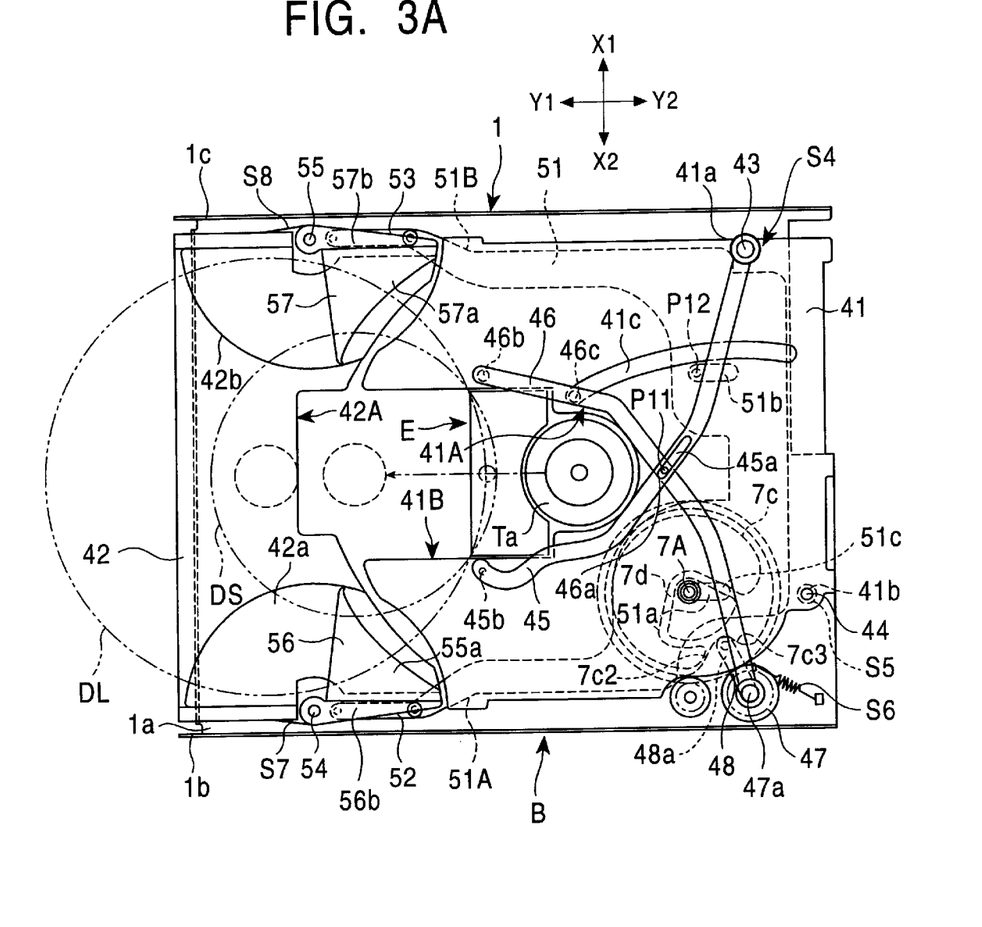
FIGS. 3A and 3B illustrate the disk discharging means, with FIG. 3A being a plan view in the discharging state and FIG. 3B being a side view of FIG. 3A.
Figure 3B:
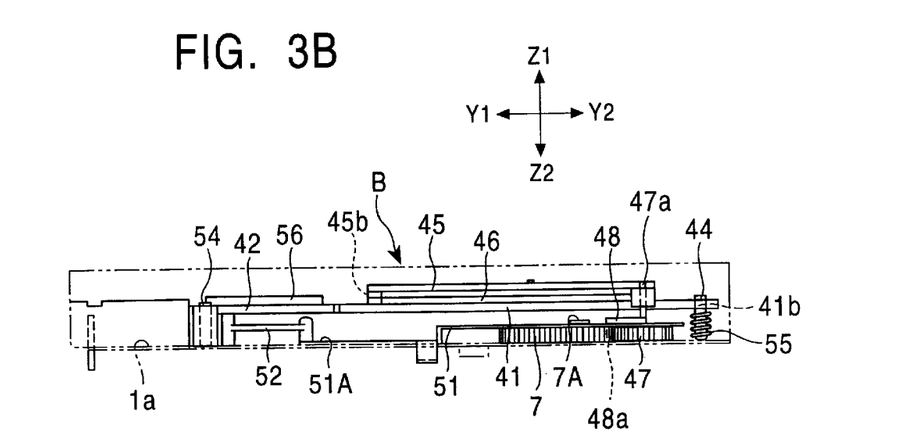
Figure 4:
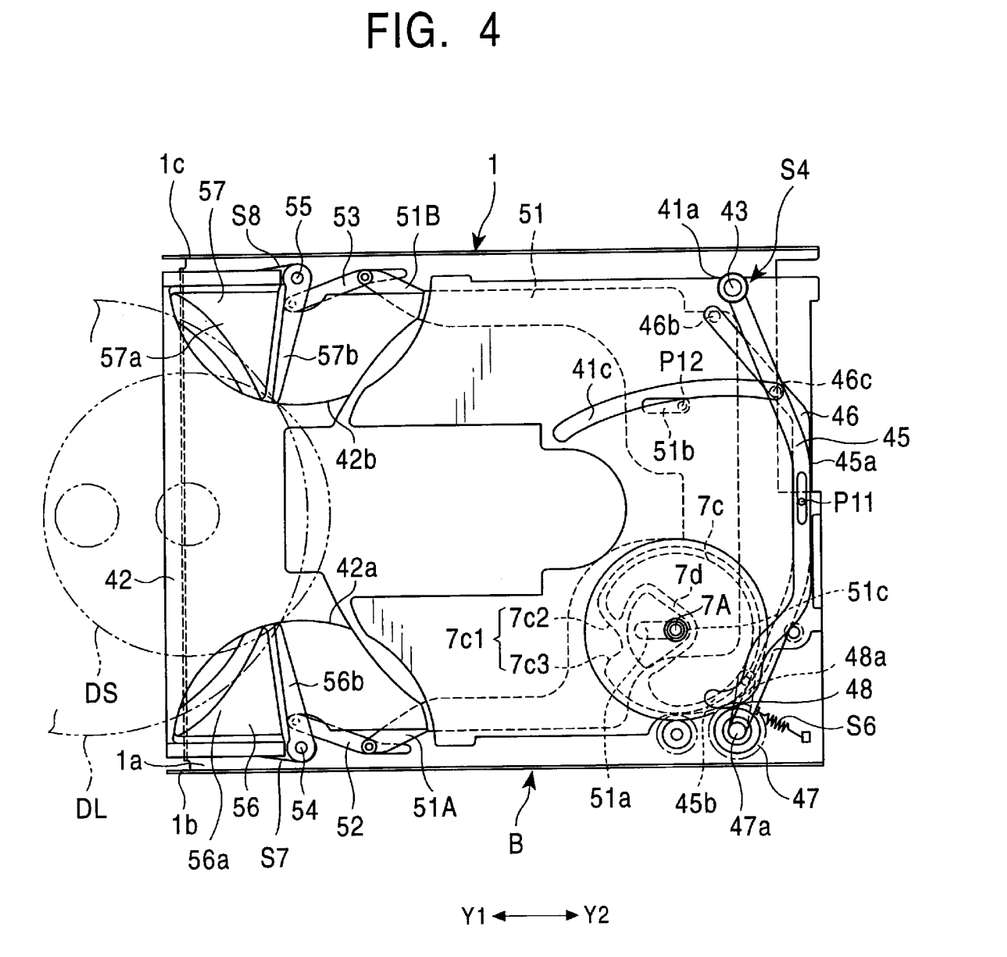
FIG. 4 is a plan view illustrating the stored state of the disk discharging means.

FIGS. 3A and 3B illustrate the disk discharging means, with FIG. 3A being a plan view in the discharging state and FIG. 3B being a side view of FIG. 3A. FIG. 4 is a plan view illustrating the stored state of the disk discharging means.

The disk discharging means B shown in FIGS. 3 and 4 is provided between the aforementioned clamping chassis 3 and the main housing 1.

The disk discharging means B is comprised of a moving table 41 side and a disk guiding plate 42 side. The moving table 41 is for raising a disk on the turntable Ta and temporarily holding it, in the event of discharging the disk. The moving table 41 is arranged so as to rise in the direction Z in the Figure by outwards pressing of through holes 41a and 41b opened on the moving table against posts 43 and 44 erected on the base plane 1a of the main housing 1. Also, force-providing members S4 and S5 formed of coil springs or the like are outwardly pressed against the aforementioned posts 43 and 44 between the moving table 41 and the base plane 1a, so that the moving table 41 is pressed in the direction Z1. On the other hand, the disk guiding plate 42 is fixed at a position of a certain height above the base plane 1a of the main housing 1.

Ejecting arms 45 and 46 comprising a first discharging member are provided on the upper face of the moving turntable 41, such as shown in FIG. 3A. The ejecting arm 45 is provided to the tip of the above post 43 so as to be rotatable and elevatable. Also, the ejecting arm 46 has one tip thereof provided to a central shaft 47a provided next to the above rotating cam 7, along with a small gear 47 and slave arm 48. The ejecting arm 46 is provided to the upper face (Z1) side of the moving table 41, so as to be rotatable and elevatable as to the central shaft 47a. On the other hand, the small gear 47 and slave arm 48 are provided to the lower face (Z2) side of the moving table 41, and the small gear 47 meshes with the gear grooves on the rotating cam 7. A protrusion 48a is formed on the tip of the slave arm 48, and is inserted into the cam groove 7c formed on the upper face of the rotating cam 7. The ejecting arm 46 and the slave arm 48 are coaxially provided on the central shaft 47a and are mutually fastened, so as to integrally rotate. Also, a force-providing member S6 is provided to the slave arm 48, which constantly forces the slave arm 48 in the clockwise direction. Accordingly, the indicator ram 46 is constantly forced in the clockwise direction.

The ejecting arm 45 and the ejecting arm 46 intersect one another by one passing over another, and the two are linked at the portion of intersecting. That is, a linking pin P11 is movably inserted between the elongated hole 45a opened in the center portion of the ejecting arm 45 and the through hole 46a formed in the ejecting arm 46, thus linking the two.

A protrusion 46c is formed between a pressing portion 46b on the tip of the above ejecting arm 46 and the above through hole 46a, so as to protrude on the Z3 direction, and is inserted through an arc-shaped guide groove 41c formed in the aforementioned moving table 41.

Now, on the upper face of the rotating cam, a cam groove 7c is formed on the outer perimeter side and a cam groove 7d is formed on the inner perimeter side, with the protrusion 48a of the slave arm 48 being inserted into the cam groove 7c as described above, and a protrusion 51c of a discharging slider 51 described later being inserted into the cam groove 7d. A crested groove 7c1 protruding in the direction of the rotating shaft 7A is formed in the cam shaft 7c (see FIG. 4), so that rotating the rotating cam 7 in the clockwise direction and the above protrusion 48a following the inclination 7c2 of the crested groove 7c1 to reach the apex thereof causes the slave arm 48 to be rotated in the counter-clockwise direction. Since the slave arm 48 and the ejecting arm 46 are integral as described above, rotating the slave arm 48 in the counter-clockwise direction as described above rotates the ejecting arm 46 in the counter-clockwise direction, which consequently extends the tip of the ejecting arm 46 in the direction Y1 shown in the Figure. At this time, the ejecting arm 45 which is linked by the linking pin P11 is also extended in the direction Y1 shown in the Figure, so that the discharging state such as shown in FIG. 3A is realized.

In the event that the rotating can is further rotated in the clockwise direction, and the aforementioned protrusion 48a passes the apex of the crested groove 7c1, the force of the force-providing member S6 causes the protrusion 48a to move along the descending slope 7c3 of the crested groove 7c1. Accordingly, the slave arm 48 is rotated in the clockwise direction, so the ejecting arms 45 and 46 are moved in the direction Y2 in the Figure and retracted, opposite to the above-described case, resulting in a stored state such as shown in FIG. 4.

Incidentally, the extending and retracting operations of the first discharging member (ejecting arms 45 and 46) are performed once each time the rotating came makes one rotation. Also, the descending slope 7c3 is of a steeper incline than the ascending slope 7c2, and further, the slave arm 48 is subjected to the force provided by the force-providing member S6, and accordingly, the retracting operation of the first discharging member is performed in a short time.

Pressing portions 456b and 46b are formed on the other tips of the ejecting arms 45 and 46. These pressing portions 456b and 46b are provided so as to face the edge portion of a disk held on the moving table 41. Accordingly, in the event of the ejecting arms 45 and 46 moving from a stored state to a discharging state, the above pressing portions 456b and 46b operate to press the edge of the disk toward the discharge opening (Y1), thereby facilitating movement of the disk D in the Y1 direction.

Next, as shown in FIGS. 3 and 4, a discharging slider 51 is provided between the moving table 41 and rotating cam 7. A pair of elongated holes 51a and 51b are opened in the discharging slider 51, with one elongated hole 51a having the rotating shaft 7A of the rotating cam 7 passed therethrough. Passed through the other elongated hole 51b is the tip of a supporting pin P12 erected on the base plane 1a. That is to say, The discharging slider 51 is slidable in the Y-axial direction in the Figure, being guided by the elongated holes 51a and 51b. Also, a protrusion 51c protruding in the direction Z2 in the Figure is provided to the discharging slider 51, and this protrusion 51c is inserted into a cam groove 7d formed on the surface of the rotating cam 7. Accordingly, the discharging slider 51 reciprocally moves in the Y-axial direction in the Figure according to the rotation of the rotating cam 7.

Link levers 52 and 53 are rotatably provided to the right and left tips 51A and 51b of the discharging slider 51, with the discharging slider 51 being linked to a later-described second discharging member by these link levers 52 and 53. The above link levers 52 and 53 are rotatable and axially supported at the lower face of later-described ejecting levers 56 and 57.

Generally half-circle-shaped stepped recessions 42a and 42b are formed at the X1 and X2 edges of the disk guiding plate 42. Also, rotating shafts 54 and 55 are erected on the base plane 1a of the main housing 1 at positions which are the center of the stepped recessions 42a and 42b. The rotating shafts 54 and 55 axially support the ejecting levers 56 and 57 which comprised the second discharging means, and receiving members 56a and 57a which are formed in a generally triangular shape are rotatable within the stepped recessions 42a and 42b.

Also, pressing pieces 56b and 57b extending in the Y2 direction in the Figure from the rotating shafts 54 and 55 are provided to the ejecting levers 56 and 57, respectively. Also, force-providing members S7 and S8 formed of wire springs or the like disposed coaxially on the rotating shafts 54 and 55 are provided to the ejecting levers 56 and 57. Thus, the ejecting lever 56 is subjected to force in the clockwise direction, and the ejecting lever 57 is subjected to force in the counter-clockwise direction.

In the event that the discharging slider is moved in the Y1 direction, the link levers 52 and 53 also move in the Y1 direction. Accordingly, the ejecting lever 56 rotates in the counter-clockwise direction and the ejecting lever 57 rotates in the clockwise direction, thereby realizing a closed state such as shown in FIG. 4. Conversely, in the event that the discharging slider is moved in the Y2 direction, the link levers 52 and 53 also move in the Y2 direction, so the ejecting lever 56 rotates in the clockwise direction and the ejecting lever 57 rotates in the counter-clockwise direction, thereby realizing a opened state wherein both the link levers 52 and 53 are pushed open toward the rear of the apparatus (i.e., in the Y2 direction). Incidentally, the first discharging member and second discharging member are for discharging a disk D at the lower tier of the above-described introducing area Q1, i.e., in a discharging area corresponding with the discharging opening.

Also, as shown in FIG. 3, a disk driving unit E is provided to a recession 41A in the moving table 41 which has been notched out in a half-circular form. That is, a turntable Ta is provided so as to face the clamper 4 shown in FIG. 1 (See FIG. 1B), and a pick-up having an optical head, a magnetic head, or the like is provided within the recession 41A in the moving table 41 which has been notched out in a half-circular form and a recession 42A on the disk guiding plate 42. The pick-up is slidably supported by a guide shaft or the like provided parallel to the Y-axial direction as shown in the Figure, for example, and is provided so as to be capable of moving toward the center of the turntable Ta. This allows playing of or recording to a disk pinched between the turntable Ta and the clamper 4.

Description will now be made regarding operation of a disk apparatus configured as described above.

Initial State Before Inserting Disk

In the initial state before inserting a disk, the first discharging member (ejecting arms 45 and 46) are in the stored state, and the second discharging member (ejecting levers 56 and 57) are in the opened state. Also, the lid plate 2, clamp chassis 3, and moving table 41 are all in the lower position toward the Z2 side (clamped state), and the slider member 14 is positioned toward the introducing opening (Y1).

Disk Insertion Operation (i) In the case of a small-diameter disk

Figure 5:
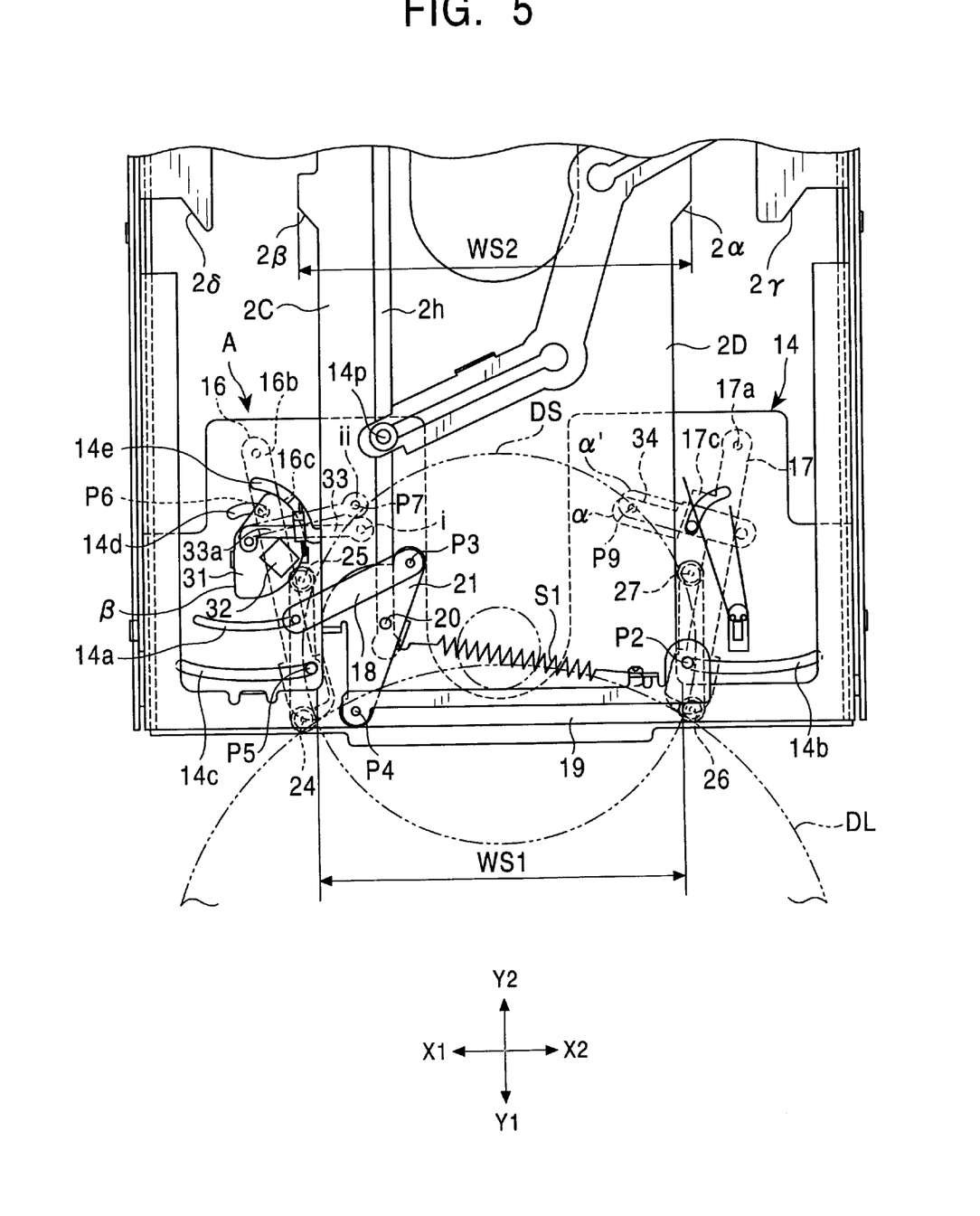
FIG. 5 is an enlarged plan view illustrating the state in which a small-diameter disk is pinched.

FIG. 5 is an enlarged plan view illustrating the state in which a small-diameter disk is pinched by the transporting means.

As shown in FIG. 5, in the event that a small-diameter disk (8 cm) DS is inserted from the introducing opening at the Y1 side, the edge of the small-diameter disk DS is pinched by the supporting pulleys 24 and 26 provided to the tip side of the introducing opening (See FIG. 2B). Accordingly, the supporting arms 22 and 23 are appropriately rotated following the edge of the small-diameter disk. Further, in the event that the small-diameter disk DS is inserted in the Y2 direction, the leading edge of the small-diameter disk DS is pinched by the supporting pulleys 25 and 27 provided to the rear portion of the apparatus, so that the entire small-diameter disk DS is supported by the four supporting pulleys 24, 25, 26, and 27.

Also, as shown in FIG. 5, the above-described detecting pins P3 and P9 are arrayed within the area of the small-diameter disk supported as shown in FIG. 5, so the edge of the small-diameter disk comes into contact with the detecting pins P7 and P9. Accordingly, the detecting arm 33 of the detecting pin 7 is rotated in the counter-clockwise direction, and at the same time, the detecting arm 34 of the detecting pin 9 is rotated in the clockwise direction. However, a restricting piece 16c of the rotating arm 16 is positioned within the rotating range of the detecting arm 33, so the detecting arm 33 rotates from the state indicated by the symbol "i" to the state indicated by the symbol "ii" at which the detecting arm 33 comes into contact with the restricting piece 16c. In the same way, the detecting arm 34 which has the detecting pin P9 rotates from the state indicated by the symbol "α" to the state indicated by the symbol "α'" at which the detecting arm 34 comes into contact with a restricting piece 17c. Stated simply, insertion of the small-diameter disk DS causes the edge of the disk to press against the detecting pins P7 and P9, and this process is completed upon reaching the state indicated by the symbols "ii" and "α'".

Also, when the detecting arm 33 is rotated, pressing on the switch 32a by the pressing piece is disengaged, so an OFF signal is output from the push-switch 32. Accordingly, the disk apparatus can detect that a small-diameter disk has newly been pinched by the supporting pulleys 24, 25, 26, and 27.

Incidentally, in the event that the a second disk D2 is removed from the supporting pulleys 24, 25, 26, and 27 after pinching the disk, either due to a human act or due to some sort of trouble, an On signal is output from the push-switch 32 once more. Accordingly, detection can be made that the disk has been removed from the supporting pulleys, or that there has been trouble or the like during transporting.

(ii) In the case of a large-diameter disk

Figure 6:
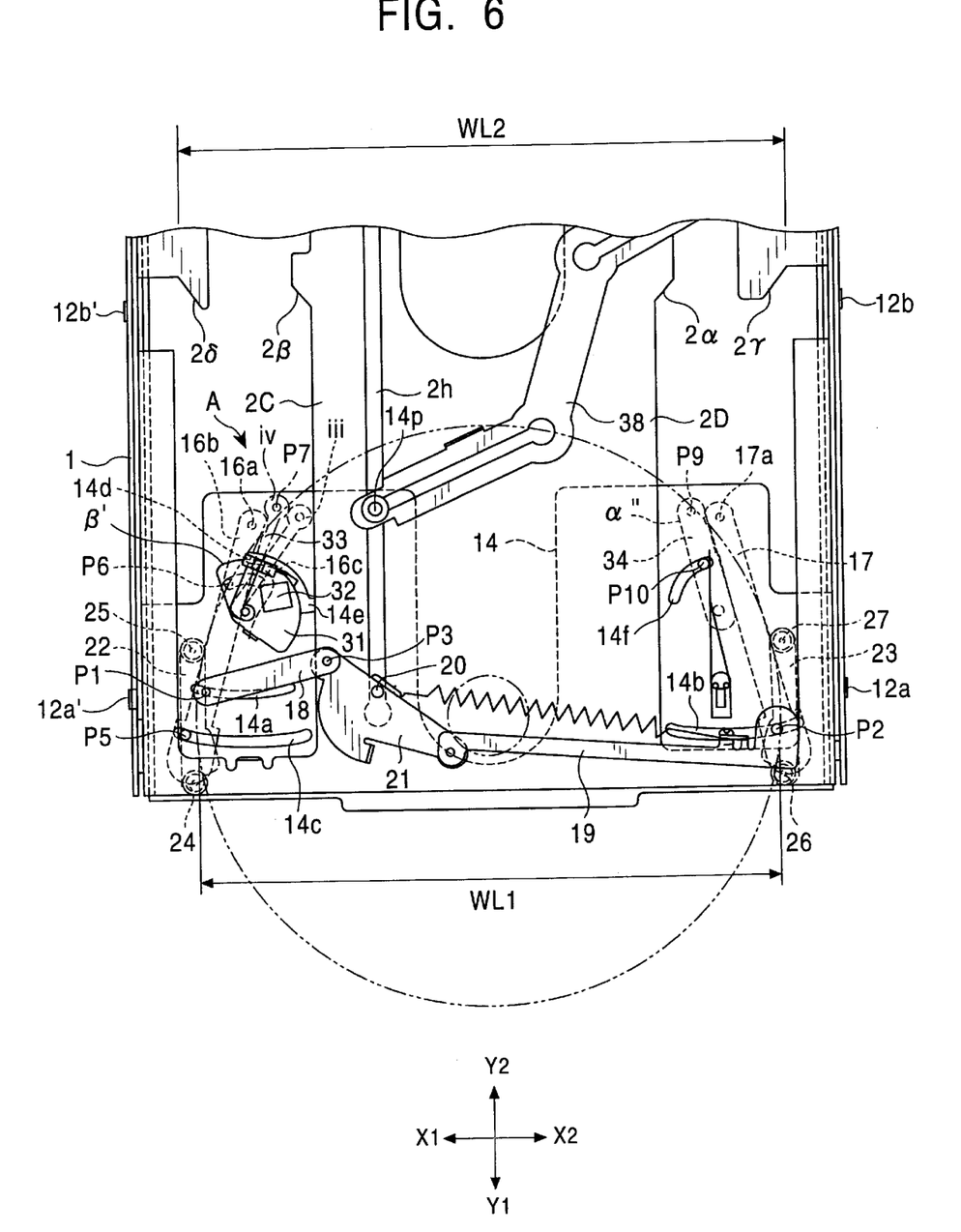
FIG. 6 is an enlarged plan view illustrating the state in which a large-diameter disk is pinched.

FIG. 6 is an enlarged plan view illustrating the state in which a large-diameter disk is pinched.

As shown in FIG. 6, in the event that a large-diameter disk (12 cm) DL is inserted from the introducing opening, the leading edge of the large-diameter disk DL comes into contact with the flange F of the supporting pulleys 24 and 26. The supporting arm 22 is rotated in the clockwise direction and the supporting arm 23 is rotated in the counter-clockwise direction, thereby slightly widening the distance between the supporting pulleys 24 and 26. In the event that the large-diameter disk DL is further inserted in the Y2 direction, the supporting pulleys 24 and 26 rotate following the edge of the large-diameter disk DL, and the rotating arms 16 and 17 are pressed open in the X1 and X2 directions, respectively. The rotation in the case is performed around the rotating link member 21 via the linking member 18 and linking arm 19 as described above, so the rotating arms 16 and 17 are pressed open equally to the left and right sides. Accordingly, the large-diameter disk DL can be linearly inserted to the rear portion (Y2) of the apparatus.

In doing so, the supporting arms 22 and 23 are respectively appropriately rotated on the supporting pin P5 and connecting pin P2, and the rotating arms 16 and 17 rotate, so that the edge of the large-diameter disk is held by the supporting pulleys 24, 25, 26, and 27.

Also, rotating the rotating arm 16 causes the elongated hole 16b of the rotating arm 16 to press the restricting pin P6 in the X1 direction, so the rotating base 31 is rotated in the counter-clockwise direction on the rotating shaft 31a, and at the same time, the restricting piece 16c is removed from the position facing the arc-shaped groove 14e. Accordingly, the detecting arm 33 does not come into contact with the restricting piece 16c anymore, and counter-clockwise rotation of the rotating base 31 is permitted. That is, the rotating base 31 is rotated from the state indicated by the symbol "β" shown in FIG. 5 to the state indicated by the symbol "β'" as shown in FIG. 6. Also, owing to the counter-clockwise rotation of the rotating base 31, the detecting arm is changed from the state indicated by the symbol "i" shown in FIG. 5 to the state indicated by the symbol "iii" shown in FIG. 6, but the detecting pin P7 is pressed by the edge of the large-diameter disk DL at the same time, so in the final state, the detecting arm 33 rotates to the state indicated by the symbol "iv" at which it is restricted by the edge of the arc-shaped groove 14e. Also, the other detecting pin P9 is pressed by the edge of the large-diameter disk DL, and is rotated from the state indicated by the symbol "α" shown in FIG. 5 to the state indicated by the symbol "α'"' in FIG. 6. Further, when the detecting arm 33 rotates from the state indicated by the symbol "iii" to the state indicated by the symbol "iv", only the detecting arm 33 is rotated, and the rotating base 31 maintains the state indicated by the symbol "β", without being affected by rotation. Accordingly, pressing of the switch 32a by the pressing piece 33a is disengaged, and an OFF signal is output from the push-switch, so the disk apparatus can detect that a large-diameter disk DL has newly been pinched by the supporting pulleys 24, 25, 26, and 27.

Incidentally, inserting of the large-diameter disk DL is completed upon the edge thereof causing the detecting pins P7 and P9 to reach the state indicated by the symbols "iv" and "α'"'.

First Disk Introducing Operation

In the following description, both the small-diameter disk DS and large-diameter disk DL pinched by the supporting pulleys 24, 25, 26, and 27 will be described as a second disk D2, unless specifically noted otherwise.

As described above, in the event that an OFF signal of the push-switch 32 is detected in the disk inserting operation, a spindle motor (not shown) of the disk driving unit E is stopped, and the playing or recording operation of the disk which hand already been mounted (hereafter referred to as the "first disk") is quit. Next, the rotating cam 7 receives rotation from the driving motor M and begins rotating, the clamp chassis 3 rises at the rear potion of the disk apparatus, and the clamped state of the disk is disengaged. That is to say, as described above, the second linkage member is rocked in the counter-clockwise direction, the elevating member 9 is moved in the Y2 direction, and the elevating member 9' is moved in the Y1 direction. Accordingly, the moving pins 13a and 13b climb the inclination of the crank grooves 9b and 9c, and the moving pins 13a' and 13b' at the side plate 3a' climb the inclination of the crank grooves 9b' and 9c', whereby the clamp chassis 3 ascends in the Z1 direction so as not to be in a clamped state. Then, synchronously with the rising of the clamp chassis 3, the moving table is forced by the force-providing members S4 and S5 to rise in the Z1 direction, and the first discharging member also rises.

As described above, a second disk D2 (small-diameter disk DS and large-diameter disk DL) held by the supporting pulleys 24, 25, 26, and 27 are transported to the rear of the disk apparatus by movement of the sliding member 14 in the direction Ys shown in the Figure.

As shown in FIG. 2, rotational driving force of the driving motor is transmitted to the transmission gear 37 via the above-described gear train so as to rotate the large gear 36 in the clockwise direction. at this time, the guiding pin 36b moves through the sliding groove 38a, thus rotating the transporting arm 38 in the clockwise direction. Also, the linking pin 14p is moved through the aforementioned guiding groove 2h in the Y2 axial direction shown in the Figure, so the sliding member 14 connected to the linking pin 14p is moved toward the rear of the disk apparatus. That is to say, the sliding member 14 moves toward the rear of the disk apparatus while maintaining the state of holding the disk D2 with the supporting pulleys 24, 25, 26, and 27.

As shown in FIGS. 2, 5, and 6, large openings 2C and 2D are opened in the lid plate 2 in the Y direction. At the approximate center of the openings 2C and 2D, tapered portions 2α, 2β, 2γ, and 2δ are formed.

In the event that the second disk D2 is a small-diameter disk DS, the connecting pin P2 and the tapered portion 2α face each other, and the connecting pin P5 and the tapered portion 2β face each other. Now, with the width between the connecting pin P2 of the transporting means A holding the small-diameter disk DS and the supporting pin P5 represented by WS1, and the width between the tapered portion 2α and the tapered portion 2β represented by WS2, the relation between the two is described as WS1<WS2. Accordingly, in the event that the sliding member 14 moves in the direction toward the rear of the apparatus (Y2) with the transporting means A holding a small-diameter disk DS, the above connecting pin P2 and supporting pin P5 strike against the above tapered portions 2α and 2β respectively, but the introducing operation of the sliding member 14 is temporarily stopped at this point.

On the other hand, in the event that the second disk D2 is a large-diameter disk DL, the connecting pin P2 and the tapered portion 2γ face each other, and the connecting pin P5 and the tapered portion 2δ face each other. With the width between the connecting pin P2 of the transporting means A holding the large-diameter disk DL and the supporting pin P5 represented by WL1, and the width between the tapered portion 2γ and the tapered portion 2δ represented by WL2, the relation between the two is described as WL1<WL2.

Accordingly, in the event that the sliding member 14 moves in the direction toward the rear of the apparatus (Y2) with the transporting means A holding a large-diameter disk DL, the above connecting pin P2 and supporting pin P5 strike against the above tapered portions 2γ and 2δ respectively. In the same way as with the small-diameter disk DS, the introducing operation of the sliding member 14 is temporarily stopped at the point of the above connecting pin P2 and supporting pin P5 striking against the tapered portions 2γ and 2δ.

Incidentally, in the case of either the aforementioned large-diameter disk DL or the small-diameter disk DS, the second disk D2 after introduction (small-diameter disk DS and large-diameter disk DL) is positioned between the clamper 4 and the turntable Ta. Also, at the position at which the sliding member 14 has temporarily stopped, a supporting protrusion (hub) of the turntable Ta is positioned approximately directly below the center hole of the second disk D2, and the clamper 4 is positioned approximately directly above.

Disk Discharging Operation

As described above, while disk introducing operation is being performed at the introducing area Q1 at the upper tier of the disk apparatus, disk discharging operation is being performed at the lower tier in a parallel manner.

The first disk D1 which had been playing or recording until then remains loaded on the moving table 41 which has risen synchronously with the rising of the clamping chassis 3. Rotation of the rotating cam 7 causes the ejecting arms 45 and 46 which had been in the stored position to be extended in the direction Y1 shown in the Figure. Accordingly, the pressing portions 45b and 46b at the tips of the ejecting arms 45 and 46 press the first disk D1 on the moving table 41 in the Y1 direction, and moves the disk D1 to the operating area of the later-described ejecting levers 56 and 57. Incidentally, as soon as the ejecting arms 45 and 46 shift from a stored state to an extended state, they are returned to the stored state again (See FIG. 4).

Further rotating of the rotating cam 7 rotates the ejecting levers 56 and 57 which were in an open state to a closed state. That is to say, as described above, the discharging slider 51 is moved to the Y1 direction by the protrusion 51c which is inserted into the cam groove 7d in the rotating cam 7. Accordingly, the link levers 52 and 53 are moved in the Y1 direction, so the ejecting levers 56 and 57 are shifted to a closed state. At this time, the edge of the first disk D1 at the rear side of the apparatus is pushed out in the Y1 direction in the Figure by pressing pieces 56b and 57b formed on the ejecting levers 56 and 57, so the first disk D1 is discharged from the discharging opening to the outside of the apparatus. That is, the ejecting levers 56 and 57 serve to further lead the first disk D1, which has been pressed out from the turntable Ta by the ejecting arms 45 and 46, to the discharging opening.

Also, even in the event that the first disk D1 which has been discharged to the discharging opening is pressed in the Y2 direction, the rotating cam 7 is subjected to reverse rotation, so the ejecting levers 56 and 57 in the closed state are not opened. This prevents a discharged disk from being introduced back into the disk apparatus.

Second Disk Introducing Operation

As described above, in the event that a new second disk D2 is inserted from the introducing opening, the first disk D1 which had been playing or recording in the disk apparatus is discharged from the discharging opening. Accordingly, no first disk D1 exists on the turntable Ta. However, the new second disk D2 which has been introduced by being held by the transporting means A is held between the clamper 4 and the turntable Ta.

Further rotating the rotating cam 7 in this state causes the lid plate 2 and the clamp chassis 3 to descend in the Z2 direction, so clamping operation of the second disk D2 is performed.

That is to say, as described above, rotation of the rotating cam 7 causes the first linkage member 5 to be rocked in the counter-clockwise direction, whereby the elevating member 8 and the elevating member 8' are moved relatively, the moving pins 12a and 12b at the side plate 1b descend the slope of the crank grooves 8b and 8c, and the moving pins 12a' and 12b' at the side plate 1c descend the slope of the crank grooves 8b', and 8c', so that the lid plate 2 descends. In the same manner, the second linkage member is rocked in the clockwise direction, whereby the elevating member 9 and elevating member 9' are relatively moved, the moving pins 13a and 13b at the side plate 3a descend the slope of the crank grooves 9b and 9c, and the moving pins 13a' and 13b' at the side plate 3a' descend the slope of the crank grooves 9b' and 9c', so that the clamp chassis 3 descends. The descending of this clamp chassis 3 causes the center hole of the second disk D2 to be dislodged from the supporting protrusion (hub) of the turntable Ta, and the second disk D2 is clamped between the clamper 4 and turntable Ta. Incidentally, descending of the clamp chassis 3 also lowers the moving table 41 and the first discharging means in the Z2 direction.

Also, this clamping operation is performed with the second disk D2 being held by the supporting pulleys 24, 25, 26, and 27. Accordingly, the edge portion of the second disk D2 is held by the supporting pulleys 24, 25, 26, and 27, and only the center hole portion is pressed in the direction of the turntable Ta by the clamper 4, so the disk is held in a state wherein the center portion thereof is slightly bent downwards (in the Z2 direction) in a convex manner.

When the clamping operation of the second disk D2 ends, introduction of the slider member 14 is resumed. That is, from the above-described state wherein the disk introducing operation is temporarily stopped, the slider member 14 is further introduced toward the rear of the apparatus.

In the event that the second disk D2 is a small-diameter disk DS, the connecting pin P2 is pressed open in the X2 direction by the tapered portion 2α, and at the same time, the supporting pin P5 is pressed open in the X1 direction by the tapered portion 2β. Accordingly, the width WS1 between the connecting pin P2 and the supporting pin P5 is pressed open to the width WS2 between the tapered portion 2α and the tapered portion 2β, so the spacing between the supporting pulleys 24 and 25, and the supporting pulleys 26 and 27 is also increased. Thus, the small-diameter disk DS is released from the supporting pulleys 24, 25, 26, and 27, so that the small-diameter disk DS is clamped on the turntable Ta horizontally.

On the other hand, in the event that the second disk D2 is a large-diameter disk DL, the connecting pin P2 is pressed open in the X2 direction by the tapered portion 2γ, and the supporting pin P5 is pressed open in the X1 direction by the tapered portion 2δ. Accordingly, the width WL1 between the connecting pin P2 and the supporting pin P5 is pressed open to the width WL2 between the tapered portion 2α and the tapered portion 2β. Thus, the large-diameter disk DL is released from the supporting pulleys 24, 25, 26, and 27, so that the large-diameter disk DL on the turntable Ta is horizontal.

At The Time of Playing or Recording Operation

As described above, in the event that a new second disk D2 is clamped onto the turntable Ta, the rotation of the spindle motor of the disk driving unit is started, thus providing rotation to the second disk D2. Then, the pick-up is moved in the radius direction of the disk, thus performing operations of playing from or recording to the second disk D2.

On the other hand, the disk D1 which has been discharged to the discharging opening is in a state capable of being removed by human means. A sensor for detecting whether or not a disk remains (i.e., a photo-sensor or the like) is provided near the discharging opening, so in the event that the first disk D1 remains at the discharging opening, the slider member 14 which has moved to the rear area of the apparatus remains there for the playing or recording operation of the disk.

Also, in the event that the above sensor detects that the first disk D1 has been removed from the discharging opening, further rotation is provided to the rotating cam 7. This rotating operation moves the slider member 14 toward the direction of the introducing opening (Y1), an also moves the discharging slider 51 in the Y1 direction to shift the ejecting levers 56 and 57 serving as the second discharging member into an opened state, thereby resetting to the initial state again. In other words, the mechanism is set to the standby state, waiting for insertion of the next new disk.

According to the present invention described in detail above, disk introducing means and disk discharging means can be driven with the same force, thereby simplifying the power transmitting mechanism.

Also, the disk introducing means and disk discharging means can be driven simultaneously, so time required for exchanging disks can be reduced.

What is claimed is:

1. A power transmitting mechanism for a disk apparatus, comprising:

a first gear provided to an upper side of a disk inserting area;

a second gear provided to a lower side of said disk inserting area; and a third gear meshing with both said first gear and said second gear, thereby simultaneously driving both said first gear and said second gear, said third gear including an upper toothed wheel to mesh with said first gear and a lower toothed wheel to mesh with said second gear, said upper toothed wheel having a first fitting portion and said lower toothed wheel having a second fitting portion;

wherein both said first gear and said second gear are rotated coaxially and at a same pitch circle;

said second gear causes action of a disk discharging mechanism at a time said first gear causes action of a disk loading mechanism; and when said first fitting portion and said second fitting portion are engaged, said upper toothed wheel and said lower toothed wheel approaches one another or and are distanced from each other.

2. A power transmitting mechanism for a disk apparatus according to claim 1, wherein when said upper toothed wheel and lower toothed wheel are distanced, a disk on the turntable is clamped by a clamping mechanism.

3. A power transmitting mechanism for a disk apparatus according to claim 1, wherein when said upper toothed wheel and lower toothed wheel approach one another, a disk on the turntable is clamped by a clamping mechanism.

* * * * *

UNITED STATES PATENT AND TRADEMARK OFFICE
CERTIFICATE OF CORRECTION

PATENT NO.   : 6,198,713 B1
DATED        : March 6, 2001
INVENTOR(S)  : Toshihiro Sakurai et al.

Page 1 of 1

It is certified that error appears in the above-identified patent and that said Letters Patent is hereby corrected as shown below:

<u>Claim 1,</u>
Line 22, change "approaches one another or and" to -- approaches one another or --.

Signed and Sealed this

Sixteenth Day of April, 2002

Attest:

JAMES E. ROGAN
*Attesting Officer*           *Director of the United States Patent and Trademark Office*